(12) United States Patent
Matsumoto et al.

(10) Patent No.: US 8,598,548 B2
(45) Date of Patent: Dec. 3, 2013

(54) METHOD FOR TREATING A PLURALITY OF MAGNETIC RECORDING MEDIA WITH ULTRAVIOLET RAYS

(75) Inventors: Takako Matsumoto, Matsumoto (JP); Kenji Hishinuma, Hino (JP); Yoshinori Ozawa, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/569,919

(22) Filed: Aug. 8, 2012

(65) Prior Publication Data

US 2013/0043410 A1   Feb. 21, 2013

(30) Foreign Application Priority Data

Aug. 16, 2011   (JP) .................................. 2011-177924

(51) Int. Cl.
*B05D 3/06*   (2006.01)
(52) U.S. Cl.
USPC .................. 250/493.1; 250/492.1; 250/494.1; 250/504 R
(58) Field of Classification Search
USPC ...................... 250/492.1, 493.1, 494.1, 504 R
See application file for complete search history.

(56) References Cited

U.S. PATENT DOCUMENTS

| | | | | |
|---|---|---|---|---|
| 4,276,479 A | * | 6/1981 | Mibu et al. | 250/492.1 |
| 6,204,504 B1 | * | 3/2001 | Lewis | 250/365 |
| 6,865,147 B2 | * | 3/2005 | Hosokawa | 369/288 |
| 6,946,166 B2 | * | 9/2005 | Iso et al. | 427/536 |
| 7,297,362 B2 | * | 11/2007 | Isozaki | 427/127 |
| 2004/0200981 A1 | * | 10/2004 | Liu et al. | 250/492.1 |
| 2008/0081220 A1 | * | 4/2008 | Watanabe et al. | 428/814 |
| 2011/0056908 A1 | * | 3/2011 | Fukushima et al. | 216/22 |

FOREIGN PATENT DOCUMENTS

WO   WO-2007/020723 A1   2/2007

* cited by examiner

*Primary Examiner* — Michael Logie
(74) *Attorney, Agent, or Firm* — Rabin & Berdo, P.C.

(57) ABSTRACT

A method for treating a plurality of magnetic recording media with ultraviolet radiation. Each of the magnetic recording media has a magnetic film, a protective film, and a lubricant film on a non-magnetic substrate. The method includes first irradiating all of the magnetic recording media with ultraviolet radiation and then irradiating a group of the magnetic recording media with ultraviolet radiation, which includes less than all of the magnetic recording media.

12 Claims, 3 Drawing Sheets

METHOD FOR TREATING A PLURALITY OF MAGNETIC RECORDING MEDIA WITH ULTRAVIOLET RAYS

CROSS-REFERENCE TO RELATED APPLICATION

This application claims the benefit of priority of Japanese patent application number 2011-177924, filed on Aug. 16, 2011, the disclosure of which is incorporated herein by reference.

BACKGROUND OF THE INVENTION

1. Field of the Invention

The present invention relates to a method for treating a plurality of magnetic recording media with ultraviolet rays. Each of these magnetic recording media is used in, for example, an external storage device of a computer.

2. Description of the Related Art

Lubricants for use in magnetic recording media, particularly in magnetic disks, have been developed in order to improve the durability and reliability of a magnetic recording medium by reducing a frictional force generated between a protective film of the magnetic recording medium and a magnetic head.

For example, attempts have conventionally been made to improve the lubrication characteristics of the surface layer of a magnetic disk: forming a diamond-like carbon (DLC) protective film on the surface layer and then forming on this protective film a perfluoropolyether lubricant film having a polar end group, such as a hydroxyl group, or a cyclic triphosphazene end group.

The lubricant film on the protective film consists of two layers: a layer bound to the protective layer (referred to as "bonded lubricant layer," hereinafter), and a layer not bound to the protective layer (referred to as "free lubricant layer," hereinafter). It is appropriate, from the perspective of the improvement of the lubrication characteristics, that the lubricant film has a thin free lubricant layer and a thick bonded lubricant layer.

However, with the recent growth in density of the magnetic disks, demands for the lubrication characteristics are becoming more and more difficult. In the future, therefore, it is inevitable to increase the maximum film thickness of the bonded lubricant layer.

Moreover, the recent hard disk drives are becoming more and more versatile, ranging from personal computers used indoors, to portable devices and car navigation systems used outdoors. Especially in an environment with high temperature and high humidity where the moisture contained in the highly humid air adheres to the disks of a hard disk drive, the moisture inhibits the magnetic head slider from floating above the disks. The problem, therefore, is how to form the lubricant film on the surface of each magnetic disk more precisely.

Increasing the film thickness of the bonded lubricant layer has been proposed as a method for solving the problem described above. In order to increase the film thickness of the bonded lubricant layer, it is said to be effective to treat each magnetic disk using ultraviolet rays during the formation of the bonded lubricant layer. In this UV treatment, instead of treating the magnetic disks one by one, the whole cassette storing the magnetic disks (e.g., a whole stack of twenty-five magnetic disks) needs to be treated, in order to improve the efficiency of the treatment and due to the steps prior to and subsequent to the UV treatment.

However, the problem in treating the whole cassette is that the film thickness of the bonded lubricant layers within the cassette varies because the waiting time of the magnetic disks for waiting to be UV-treated under a UV lamp house of an apparatus varies depending on the positions of the disks in the cassette. Whereas direct ultraviolet rays are radiated over all of the magnetic disks (e.g., a total of twenty-five magnetic disks) under the same conditions, indirect ultraviolet rays are radiated when the cassette is transported and the position of each disk is aligned with a lifter of a curtain under the UV lamp house. Therefore, a group of the magnetic disks that are treated with ultraviolet rays in the cassette around at the end (e.g., the 23rd to 25th magnetic disks out of the total of twenty-five magnetic disks) are irradiated with less indirect ultraviolet rays, reducing the bonded ratio. For this reason, the magnetic disks that are UV-treated in the cassette around at the end need to be treated in a manner that the film thickness of the bonded lubricant layers becomes equal to the film thickness of the other magnetic disks.

SUMMARY OF THE INVENTION

The present invention was contrived in view of the problems described above, and an object thereof is to reduce variation in film thickness of lubricant layers of a plurality of magnetic recording media and to provide magnetic recording media respectively having lubricant layers of even thickness.

In some embodiments of the invention, a method for treating a plurality of magnetic recording media with ultraviolet rays is provided. Each of the plurality of magnetic recording media has a magnetic film, a protective film, and a lubricant film on a non-magnetic substrate. The method includes a first irradiating step of irradiating the plurality of magnetic recording media with ultraviolet radiation. The method further includes a second irradiating step of further irradiating a group of the plurality of magnetic recording media with ultraviolet radiation. The group of magnetic recording media includes less than all of the plurality of magnetic recording media.

The first irradiating step may include irradiating each of the plurality of magnetic recording media with ultraviolet radiation for a first time period. The second irradiating step may include irradiating each of the group of magnetic recording media with ultraviolet radiation for a predetermined holding time period. The predetermined holding time period may be 1 to 1.5 times the first time period.

The present invention can reduce variation in film thickness of lubricant layers of a plurality of magnetic recording media, and can provide magnetic recording media respectively having lubricant layers of even thickness.

DESCRIPTION OF THE PREFERRED EMBODIMENTS

In the method for treating a plurality of magnetic recording media with ultraviolet rays according to the present invention, each of the plurality of magnetic recording media has a magnetic film, a protective film, and a lubricant film on a non-magnetic substrate. An ordinary non-magnetic substrate, magnetic film, and protective film can be used as the non-magnetic substrate, the protective film, and the protective film.

The method according to the present invention includes a first irradiating step of irradiating the plurality of magnetic recording media with a UV lamp, and a second irradiating step of further irradiating some of the plurality of magnetic recording media with the UV lamp. In order to simplify the structure of the apparatus and the steps, it is preferred that the UV lamp used in the first irradiating step and the UV lamp used in the second irradiating step be the same device or output; however, in the present invention, the UV lamp used in the first irradiating step and the UV lamp used in the second irradiating step may be different devices or outputs. The time required in the whole process in the present invention can be shortened if the first irradiating step and the second irradiating step are executed successively; however, in the present invention, the first irradiating step and the second irradiating step may be executed at an interval.

Preferably, the second irradiating step irradiates some of the magnetic recording media while holding them for a predetermined holding time period, the predetermined holding time period being 1 to 1.5 times the time taken in the first irradiating step. When the predetermined holding time period is 1 to 1.5 times the time taken in the first irradiating step (in other words, equal to or longer than the time for which direct light is radiated, but shorter than 1.5 times the time for which the direct light is radiated), the variation in the bonded ratio of the positions of the magnetic recording media within the cassette can be minimized.

Figure 1:
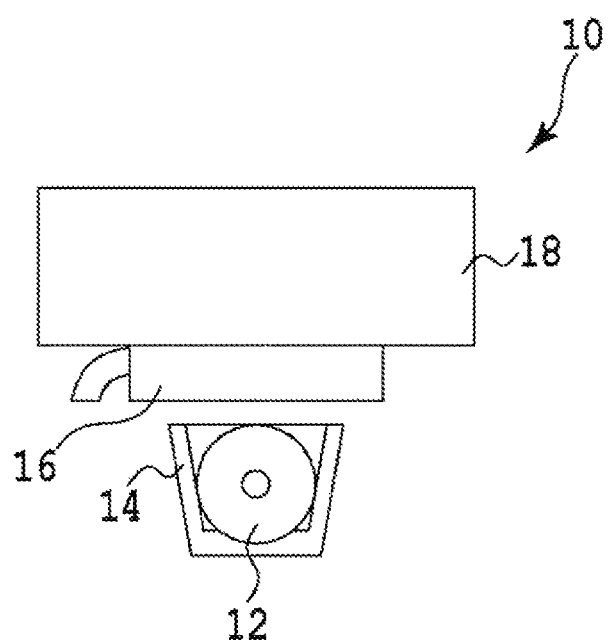
FIG. 1 shows an example of an apparatus used in a method of the present invention.

FIG. 1 shows an example of an apparatus used in the present invention. FIG. 1 shows the positions of magnetic disks 12 (a typical example of the magnetic recording media), cassette 14, curtain 16, and UV lamp house 18 storing a UV lamp (not shown), in an apparatus 10. The magnetic disks 12, cassette 14, curtain 16, and UV lamp house 18 are always positioned as shown in FIG. 1 before, during, and after radiation of direct ultraviolet rays. In order to treat the magnetic disks 12 with the direct ultraviolet rays, the cassette 14 is caused to wait under the UV lamp house 18, and the magnetic disks 12 are picked up one by one by a lifter (not shown) from under the cassette 14, while sending the cassette 14 to the position of the lifter. The direct ultraviolet rays, or ultraviolet radiation, are radiated (the first irradiating step) while putting the magnetic disks 12 into the UV lamp house 18 one by one. The indirect ultraviolet rays, or ultraviolet radiation, are generated as a result of leakage of light from the UV lamp house 18 when the cassette 14 waits thereunder. The indirect ultraviolet rays irradiation during holding (the second irradiation step) is performed such that, while the lifter returns the magnetic disks 12 to the cassette 14 and holds the cassette 14 in that position after the completion of the radiation of the direct ultraviolet rays, the indirect ultraviolet rays are radiated.

A preferred lubricant used for the magnetic recording media includes a perfluoropolyether main chain, as shown in the following chemical formulas 1 and 2, wherein at least one of the ends $R_1$, $R_2$, and $R_3$ has a plurality of functional groups and a molecular weight of 500 to 10,000.

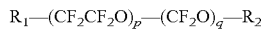  [C 1]

(where p and q are positive integers)

  [C 2]

(where r is a positive integer)

In the end structures illustrated above, it is preferred that each functional group be selected from any one of or more than one of the following: hydroxyl group, carboxyl group, aldehyde group, primary and secondary amine groups, nitro group, nitrile group, isonitrile group, isocyanato group, thiol group, sulfo group, and heterocycle. An additive may be added to the lubricant, in which case, as well, the effects of the present invention can be achieved.

According to a method for controlling the formation of a bonded lubricant layer using the indirect ultraviolet rays, for example, although, in a conventional treatment, the bonded layers become thinner when the last few magnetic disks (or a group of the magnetic disks) of the cassette are irradiated with light (e.g., the 23rd to 25th magnetic disks), in the present invention these magnetic disks are held to increase the film thickness of the bonded layers of the last few magnetic disks, so that the variation in film thickness of the bonded lubricant layers in the cassette can be reduced.

EXAMPLE

An example of the present invention is described hereinafter. The example merely illustrates a typical example of the present invention; thus, the present invention should not be limited to the illustration of the example.

Z-Tetraol (produced by Solvay Solexis) having a —OH end group was used as the lubricant. The variation in film thickness of the bonded lubricant layers was examined in a situation where a conventional UV treatment was performed (only the first irradiating step was performed) and a situation where the last few magnetic disks of the cassette were held (the 23rd to 25th disks) (both the first and second irradiating steps were carried out).

[Application of Lubricant to Magnetic Recording Medium, and Evaluation of Properties of Lubricant]

1. Sample Preparation—Application of Lubricant

An amorphous carbon protective film having a film thickness of 2.0 nm was formed according to a plasma CVD method and applied to a 65-mm (2.5") diameter magnetic disk substrate and a 95-mm (3.5") diameter magnetic disk substrate. These magnetic disk substrates were applied with the abovementioned lubricant mixture by a dip method. Specifically, each magnetic disk substrate was soaked in the lubricant mixture having Vertrel XF (produced by Du-Pont Mitsui Fluorochemicals) as a solvent for 72 seconds, pulled out of the mixture at 1.5 mm/sec, and then dried, to create a magnetic disk. The magnetic disk was placed in the measurement position, and dummy disks were placed in other positions, so that there would always be a total of twenty-five disks to be treated with the ultraviolet rays. After the lubricant mixture was applied to the magnetic disk sample, the 95-mm diameter magnetic disk was treated with the ultraviolet rays for 10 seconds and the 65-mm diameter magnetic disk for 9 seconds by a 200 W UV lamp with a wavelength of 185 nm/254 nm.

The film thickness of the lubricant layer of the sample prepared in the manner described above was measured by a Fourier transform infrared spectrophotometer (FT-IR). The magnetic disk sample was prepared such that the targeted film thickness of the lubricant layer is based on the followings: the total film thickness is 8.00 Å, the film thickness of the bonded lubricant layer is 6.00 Å, and the bonded ratio is 75.0%.

The abovementioned terms "total film thickness," "film thickness of the bonded lubricant layer," and "bonded ratio" are described below.

The bonded ratio between the functional groups existing on the carbon surface and the lubricant is generally represented as a ratio of the film thickness of the lubricant layer rinsed with a fluorinated solvent to the film thickness of the lubricant layer obtained before being rinsed with the fluorinated solvent. The percentage of it is called "bonded ratio."

Bonded ratio (%)=Film thickness of lubricant layer after rinsing/Film thickness of lubricant layer before rinsing×100  [E 1]

The film thickness of the lubricant layer before rinsing is referred to as "total film thickness," and the film thickness of the lubricant layer after rinsing is referred to as "film thickness of the bonded lubricant layer." The "film thickness of the bonded lubricant layer" represents the film thickness (amount) of the lubricant layer actually bound to the carbon surface.

Vertrel XF (produced by Du-Pont Mitsui Fluorochemicals) is generally used as the fluorinated solvent. Therefore, this solvent was used in this evaluation.

2. Evaluation of Film Thickness of Bonded Lubricant Layer

Each sample prepared by the process described above was treated with the ultraviolet rays, and the bonded ratio (the variation in film thickness of the bonded lubricant layers in the cassette) was measured. After the radiation of the direct ultraviolet rays, the last few magnetic disks (the 23rd to 25th magnetic disks) were held under the UV lamp house for a predetermined time period (for 10 seconds for the 3.5" magnetic disk, and for 13.5 seconds for the 2.5" magnetic disk), and then the indirect ultraviolet rays were radiated thereto.

Figure 2:
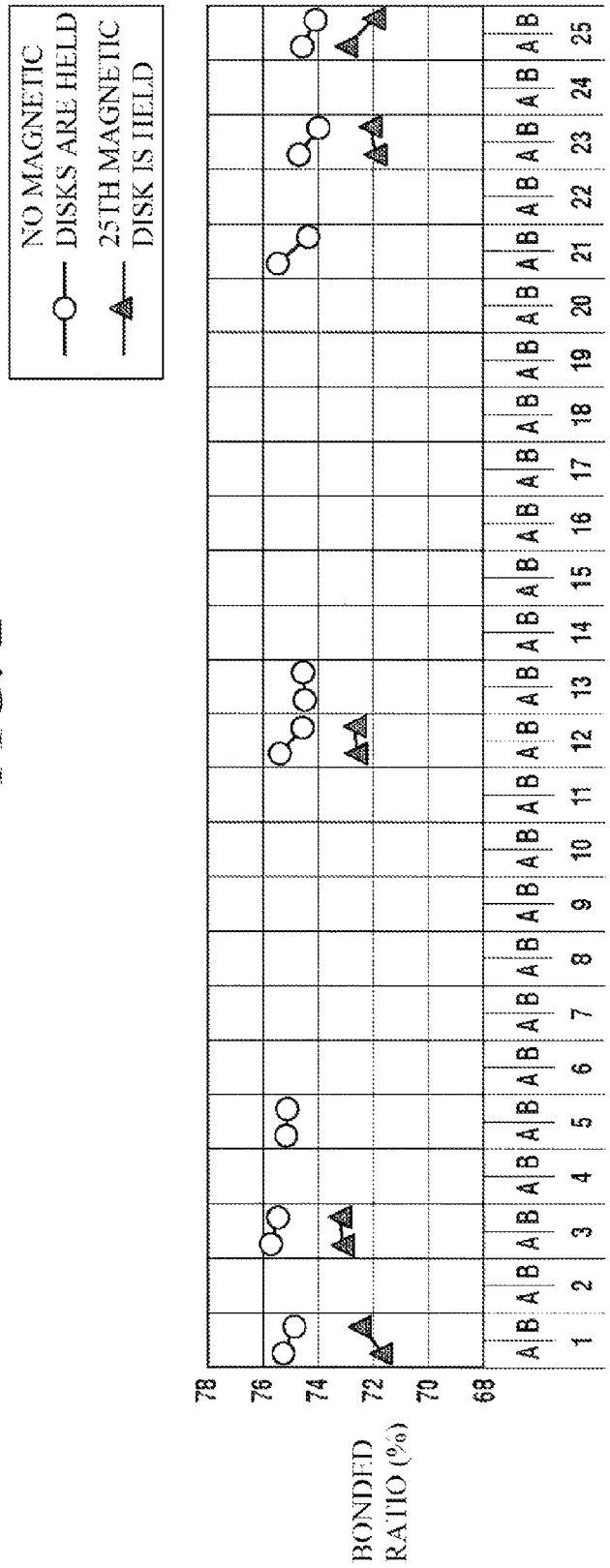
FIG. 2 shows the results of measuring the variation of a bonded ratio within a cassette when a 95-mm diameter magnetic disk is used as a magnetic recording medium.
Figure 3:
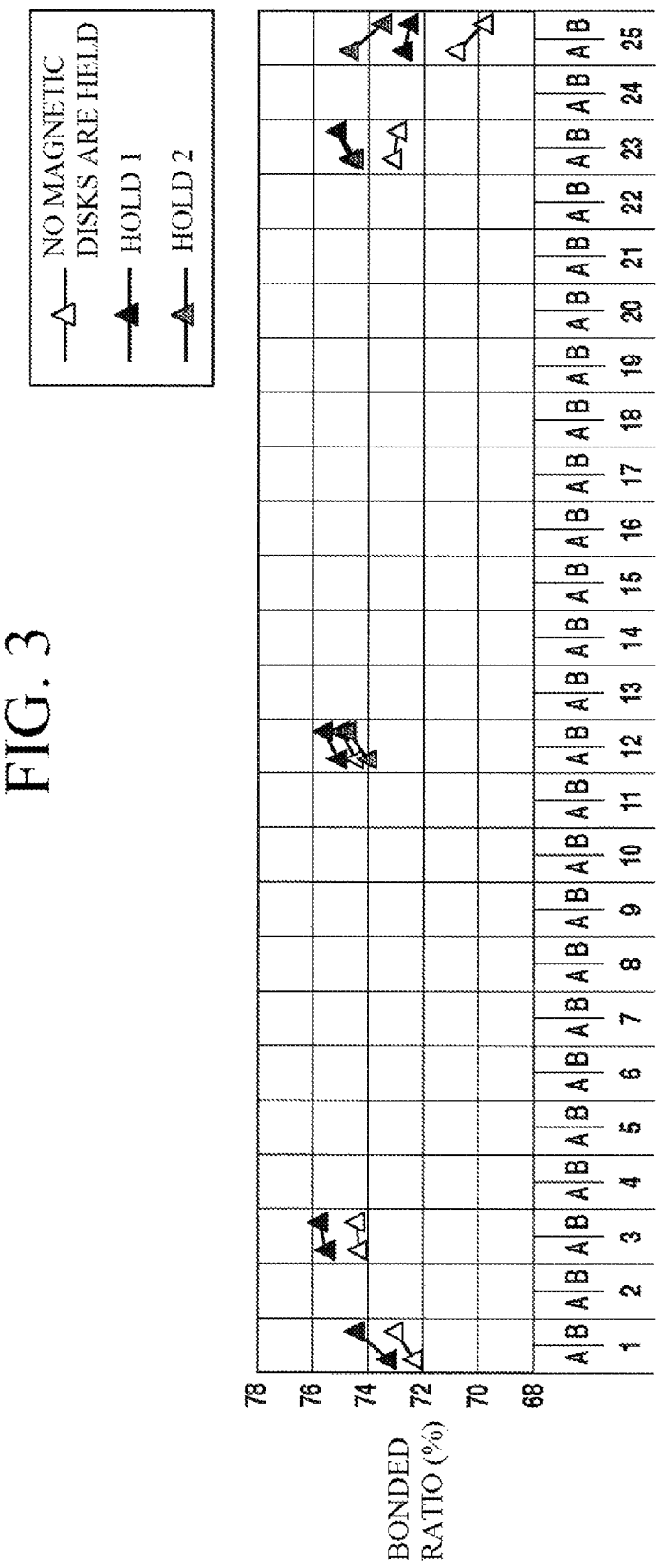
FIG. 3 shows the results of measuring the variation of a bonded ratio within a cassette when a 65-mm diameter magnetic disk is used as the magnetic recording medium.

FIG. 2 is a graph showing the bonded ratios of the 95-mm diameter magnetic disk. FIG. 3 is a graph showing the bonded ratios of the 65-mm diameter magnetic disk. The data obtained from FIGS. 2 and 3 are shown in Tables 1 to 5.

TABLE 1

3.5" disk held for 10 sec (After treating the 25th disk, held at the position of the 25th disk *above the cassette)
PFPE Ave. value

| UV Pos | | UV | Rinse | B.R. | After UV irradiation | | | | After rinsing | | | | Bonded ratio | | | | 0/180 degree difference |
|---|---|---|---|---|---|---|---|---|---|---|---|---|---|---|---|---|---|
| | | | | | 0° | 90° | 180° | 270° | 0° | 90° | 180° | 270° | 0° | 90° | 180° | 270° | |
| 1 | A | 8.51 | 6.10 | 71.70 | 8.45 | 8.28 | 8.48 | 8.81 | 6.07 | 5.99 | 6.06 | 6.27 | 71.83 | 72.34 | 71.46 | 71.17 | 0.37 |
| | B | 8.55 | 6.20 | 72.46 | 8.68 | 8.58 | 8.45 | 8.50 | 6.34 | 6.12 | 6.14 | 6.19 | 73.04 | 71.33 | 72.66 | 72.82 | 0.38 |
| 2 | A | | | | | | | | | | | | | | | | |
| | B | | | | | | | | | | | | | | | | |
| 3 | A | 8.50 | 6.21 | 73.11 | 8.37 | 8.35 | 8.49 | 8.79 | 6.21 | 6.16 | 6.20 | 6.28 | 74.19 | 73.77 | 73.03 | 71.44 | 1.17 |
| | B | 8.55 | 6.26 | 73.20 | 8.62 | 8.69 | 8.44 | 8.46 | 6.43 | 6.23 | 6.12 | 6.26 | 74.59 | 71.69 | 72.51 | 74.00 | 2.08 |
| 4 | A | | | | | | | | | | | | | | | | |
| | B | | | | | | | | | | | | | | | | |
| 5 | A | | | | | | | | | | | | | | | | |
| | B | | | | | | | | | | | | | | | | |
| 6 | A | | | | | | | | | | | | | | | | |
| | B | | | | | | | | | | | | | | | | |
| 7 | A | | | | | | | | | | | | | | | | |
| | B | | | | | | | | | | | | | | | | |
| 8 | A | | | | | | | | | | | | | | | | |
| | B | | | | | | | | | | | | | | | | |
| 9 | A | | | | | | | | | | | | | | | | |
| | B | | | | | | | | | | | | | | | | |
| 10 | A | | | | | | | | | | | | | | | | |
| | B | | | | | | | | | | | | | | | | |
| 11 | A | | | | | | | | | | | | | | | | |
| | B | | | | | | | | | | | | | | | | |
| 12 | A | 8.53 | 6.19 | 72.57 | 8.32 | 8.62 | 8.65 | 8.52 | 6.09 | 6.32 | 6.09 | 6.25 | 73.20 | 73.32 | 70.40 | 73.36 | 2.79 |
| | B | 8.60 | 6.24 | 72.61 | 8.46 | 8.60 | 8.77 | 8.55 | 6.19 | 6.28 | 6.20 | 6.29 | 73.17 | 73.02 | 70.70 | 73.57 | 2.47 |
| 13 | A | | | | | | | | | | | | | | | | |
| | B | | | | | | | | | | | | | | | | |
| 14 | A | | | | | | | | | | | | | | | | |
| | B | | | | | | | | | | | | | | | | |
| 15 | A | | | | | | | | | | | | | | | | |
| | B | | | | | | | | | | | | | | | | |
| 16 | A | | | | | | | | | | | | | | | | |
| | B | | | | | | | | | | | | | | | | |
| 17 | A | | | | | | | | | | | | | | | | |
| | B | | | | | | | | | | | | | | | | |
| 18 | A | | | | | | | | | | | | | | | | |
| | B | | | | | | | | | | | | | | | | |
| 19 | A | | | | | | | | | | | | | | | | |
| | B | | | | | | | | | | | | | | | | |
| 20 | A | | | | | | | | | | | | | | | | |
| | B | | | | | | | | | | | | | | | | |
| 21 | A | | | | | | | | | | | | | | | | |
| | B | | | | | | | | | | | | | | | | |
| 22 | A | | | | | | | | | | | | | | | | |
| | B | | | | | | | | | | | | | | | | |
| 23 | A | 8.51 | 6.12 | 71.89 | 8.38 | 8.57 | 8.65 | 8.43 | 6.07 | 6.08 | 6.11 | 6.20 | 72.43 | 70.95 | 70.64 | 73.55 | 1.80 |
| | B | 8.54 | 6.16 | 72.06 | 8.40 | 8.53 | 8.71 | 8.53 | 6.05 | 6.23 | 6.18 | 6.16 | 72.02 | 73.04 | 70.95 | 72.22 | 1.07 |
| 24 | A | | | | | | | | | | | | | | | | |
| | B | | | | | | | | | | | | | | | | |
| 25 | A | 8.50 | 6.19 | 72.89 | 8.29 | 8.42 | 8.72 | 8.56 | 6.15 | 6.14 | 6.22 | 6.26 | 74.19 | 72.92 | 71.33 | 73.13 | 2.86 |
| | B | 8.53 | 6.14 | 72.07 | 8.37 | 8.71 | 8.58 | 8.44 | 6.14 | 6.20 | 6.09 | 6.14 | 73.36 | 71.18 | 70.98 | 72.75 | 2.38 |

TABLE 2

Bonded ratio by Pos when 3.5" disk is used (No magnetic disks are held)
PFPE Ave. value R30 4 point value

| UV Pos | | UV | Rinse | B.R. | After UV irradiation | | | | After rinsing | | | | Bonded ratio | | | | 0/180 degree difference |
|---|---|---|---|---|---|---|---|---|---|---|---|---|---|---|---|---|---|
| | | | | | 0° | 90° | 180° | 270° | 0° | 90° | 180° | 270° | 0° | 90° | 180° | 270° | |
| 1 | A | 7.43 | 5.59 | 75.27 | 7.44 | 7.53 | 7.37 | 7.38 | 5.59 | 5.70 | 5.47 | 5.61 | 75.13 | 75.70 | 74.22 | 76.02 | 0.91 |
| | B | 7.40 | 5.54 | 74.85 | 7.42 | 7.23 | 7.45 | 7.48 | 5.58 | 5.44 | 5.50 | 5.62 | 75.20 | 75.24 | 73.83 | 75.13 | 1.38 |
| 2 | A | | | | | | | | | | | | | | | | |
| | B | | | | | | | | | | | | | | | | |
| 3 | A | 7.44 | 5.63 | 75.69 | 7.27 | 7.42 | 7.58 | 7.50 | 5.56 | 5.61 | 5.56 | 5.80 | 76.48 | 75.61 | 73.35 | 77.33 | 3.13 |
| | B | 7.40 | 5.58 | 75.43 | 7.33 | 7.50 | 7.38 | 7.37 | 5.69 | 5.57 | 5.46 | 5.59 | 77.63 | 74.27 | 73.98 | 75.85 | 3.64 |
| 4 | A | | | | | | | | | | | | | | | | |
| | B | | | | | | | | | | | | | | | | |
| 5 | A | 7.44 | 5.59 | 75.12 | 7.38 | 7.56 | 7.42 | 7.38 | 5.57 | 5.67 | 5.44 | 5.66 | 75.47 | 75.00 | 73.32 | 76.69 | 2.16 |
| | B | 7.41 | 5.57 | 75.11 | 7.38 | 7.40 | 7.44 | 7.43 | 5.57 | 5.68 | 5.48 | 5.54 | 75.47 | 76.76 | 73.66 | 74.56 | 1.82 |
| 6 | A | | | | | | | | | | | | | | | | |
| | B | | | | | | | | | | | | | | | | |
| 7 | A | | | | | | | | | | | | | | | | |
| | B | | | | | | | | | | | | | | | | |
| 8 | A | | | | | | | | | | | | | | | | |
| | B | | | | | | | | | | | | | | | | |
| 9 | A | | | | | | | | | | | | | | | | |
| | B | | | | | | | | | | | | | | | | |
| 10 | A | | | | | | | | | | | | | | | | |
| | B | | | | | | | | | | | | | | | | |
| 11 | A | | | | | | | | | | | | | | | | |
| | B | | | | | | | | | | | | | | | | |
| 12 | A | 7.47 | 5.63 | 75.32 | 7.38 | 7.51 | 7.59 | 7.40 | 5.59 | 5.64 | 5.56 | 5.71 | 75.75 | 75.10 | 73.25 | 77.16 | 2.49 |
| | B | 7.45 | 5.55 | 74.51 | 7.36 | 7.49 | 7.46 | 7.47 | 5.53 | 5.68 | 5.40 | 5.58 | 75.14 | 75.83 | 72.39 | 74.70 | 2.75 |
| 13 | A | 7.44 | 5.54 | 74.44 | 7.42 | 7.58 | 7.28 | 7.46 | 5.53 | 5.68 | 5.32 | 5.61 | 74.53 | 74.93 | 73.08 | 75.20 | 1.45 |
| | B | 7.42 | 5.53 | 74.47 | 7.34 | 7.36 | 7.48 | 7.51 | 5.52 | 5.51 | 5.47 | 5.61 | 75.20 | 74.86 | 73.13 | 74.70 | 2.08 |
| 14 | A | | | | | | | | | | | | | | | | |
| | B | | | | | | | | | | | | | | | | |
| 15 | A | | | | | | | | | | | | | | | | |
| | B | | | | | | | | | | | | | | | | |
| 16 | A | | | | | | | | | | | | | | | | |
| | B | | | | | | | | | | | | | | | | |
| 17 | A | | | | | | | | | | | | | | | | |
| | B | | | | | | | | | | | | | | | | |
| 18 | A | | | | | | | | | | | | | | | | |
| | B | | | | | | | | | | | | | | | | |
| 19 | A | | | | | | | | | | | | | | | | |
| | B | | | | | | | | | | | | | | | | |
| 20 | A | | | | | | | | | | | | | | | | |
| | B | | | | | | | | | | | | | | | | |
| 21 | A | 7.43 | 5.60 | 75.38 | 7.25 | 7.45 | 7.43 | 7.60 | 5.53 | 5.65 | 5.44 | 5.79 | 76.28 | 75.84 | 73.22 | 76.18 | 3.06 |
| | B | 7.47 | 5.55 | 74.32 | 7.33 | 7.56 | 7.60 | 7.40 | 5.55 | 5.66 | 5.49 | 5.51 | 75.72 | 74.87 | 72.24 | 74.46 | 3.48 |
| 22 | A | | | | | | | | | | | | | | | | |
| | B | | | | | | | | | | | | | | | | |
| 23 | A | 7.43 | 5.54 | 74.61 | 7.31 | 7.40 | 7.46 | 7.53 | 5.48 | 5.50 | 5.47 | 5.71 | 74.97 | 74.32 | 73.32 | 75.83 | 1.64 |
| | B | 7.50 | 5.54 | 73.95 | 7.41 | 7.67 | 7.55 | 7.35 | 5.52 | 5.74 | 5.47 | 5.44 | 74.49 | 74.84 | 72.45 | 74.01 | 2.04 |
| 24 | A | | | | | | | | | | | | | | | | |
| | B | | | | | | | | | | | | | | | | |
| 25 | A | 7.43 | 5.35 | 74.51 | 7.37 | 7.50 | 7.49 | 7.34 | 5.37 | 5.22 | 5.36 | 5.46 | 72.86 | 69.60 | 71.56 | 74.39 | 1.30 |
| | B | 7.42 | 5.25 | 74.00 | 7.22 | 7.42 | 7.51 | 7.51 | 5.12 | 5.26 | 5.35 | 5.26 | 70.91 | 70.89 | 71.24 | 70.04 | −0.32 |

TABLE 3

2.5" disk held for 9 sec (before and after treating the ½sth disk, Hold 1 *above the cassette)
PFPE Ave. value

| UV Pos | | UV | Rinse | B.R. | After UV irradiation | | | | After rinsing | | | | Bonded ratio | | | | 0/180 degree difference |
|---|---|---|---|---|---|---|---|---|---|---|---|---|---|---|---|---|---|
| | | | | | 0° | 90° | 180° | 270° | 0° | 90° | 180° | 270° | 0° | 90° | 180° | 270° | |
| 1 | A | 7.99 | 5.86 | 73.26 | 7.97 | 7.79 | 8.26 | 7.95 | 5.97 | 5.64 | 5.94 | 5.87 | 74.91 | 72.40 | 71.91 | 73.84 | 2.99 |
| | B | 8.24 | 6.13 | 74.46 | 8.08 | 8.21 | 8.37 | 8.28 | 6.19 | 6.16 | 6.12 | 6.05 | 76.61 | 75.03 | 73.12 | 73.07 | 3.49 |
| 2 | A | | | | | | | | | | | | | | | | |
| | B | | | | | | | | | | | | | | | | |
| 3 | A | 8.22 | 6.21 | 75.52 | 8.06 | 8.23 | 8.33 | 8.25 | 6.20 | 6.25 | 6.15 | 6.22 | 76.92 | 75.94 | 73.83 | 75.39 | 3.09 |
| | B | 8.26 | 6.25 | 75.76 | 8.09 | 8.26 | 8.43 | 8.24 | 6.22 | 6.29 | 6.19 | 6.31 | 76.89 | 76.15 | 73.43 | 76.58 | 3.46 |
| 4 | A | | | | | | | | | | | | | | | | |
| | B | | | | | | | | | | | | | | | | |
| 5 | A | | | | | | | | | | | | | | | | |
| | B | | | | | | | | | | | | | | | | |

TABLE 3-continued 2.5" disk held for 9 sec (before and after treating the ⅕th disk, Hold 1 *above the cassette)
PFPE Ave. value

| UV Pos | | UV | Rinse | B.R. | After UV irradiation | | | | After rinsing | | | | Bonded ratio | | | | 0/180 degree difference |
| --- | --- | --- | --- | --- | --- | --- | --- | --- | --- | --- | --- | --- | --- | --- | --- | --- | --- |
| | | | | | 0° | 90° | 180° | 270° | 0° | 90° | 180° | 270° | 0° | 90° | 180° | 270° | |
| 6 | A | | | | | | | | | | | | | | | | |
| | B | | | | | | | | | | | | | | | | |
| 7 | A | | | | | | | | | | | | | | | | |
| | B | | | | | | | | | | | | | | | | |
| 8 | A | | | | | | | | | | | | | | | | |
| | B | | | | | | | | | | | | | | | | |
| 9 | A | | | | | | | | | | | | | | | | |
| | B | | | | | | | | | | | | | | | | |
| 10 | A | | | | | | | | | | | | | | | | |
| | B | | | | | | | | | | | | | | | | |
| 11 | A | | | | | | | | | | | | | | | | |
| | B | | | | | | | | | | | | | | | | |
| 12 | A | 8.27 | 6.21 | 75.06 | 8.11 | 8.37 | 8.31 | 8.28 | 6.20 | 6.25 | 6.13 | 6.24 | 76.45 | 74.67 | 73.77 | 75.36 | 2.68 |
| | B | 8.25 | 6.23 | 75.57 | 8.23 | 8.26 | 8.22 | 8.28 | 6.28 | 6.28 | 6.13 | 6.24 | 76.31 | 76.03 | 74.57 | 75.36 | 1.73 |
| 13 | A | | | | | | | | | | | | | | | | |
| | B | | | | | | | | | | | | | | | | |
| 14 | A | | | | | | | | | | | | | | | | |
| | B | | | | | | | | | | | | | | | | |
| 15 | A | | | | | | | | | | | | | | | | |
| | B | | | | | | | | | | | | | | | | |
| 16 | A | | | | | | | | | | | | | | | | |
| | B | | | | | | | | | | | | | | | | |
| 17 | A | | | | | | | | | | | | | | | | |
| | B | | | | | | | | | | | | | | | | |
| 18 | A | | | | | | | | | | | | | | | | |
| | B | | | | | | | | | | | | | | | | |
| 19 | A | | | | | | | | | | | | | | | | |
| | B | | | | | | | | | | | | | | | | |
| 20 | A | | | | | | | | | | | | | | | | |
| | B | | | | | | | | | | | | | | | | |
| 21 | A | | | | | | | | | | | | | | | | |
| | B | | | | | | | | | | | | | | | | |
| 22 | A | | | | | | | | | | | | | | | | |
| | B | | | | | | | | | | | | | | | | |
| 23 | A | 8.27 | 6.18 | 74.70 | 8.33 | 8.30 | 8.30 | 8.15 | 6.07 | 6.19 | 6.27 | 6.18 | 72.87 | 74.58 | 75.54 | 75.83 | -2.67 |
| | B | 8.29 | 6.22 | 75.09 | 8.34 | 8.22 | 8.27 | 8.32 | 6.07 | 6.37 | 6.35 | 6.10 | 72.78 | 77.49 | 76.78 | 73.32 | -4.00 |
| 24 | A | | | | | | | | | | | | | | | | |
| | B | | | | | | | | | | | | | | | | |
| 25 | A | 8.28 | 6.02 | 72.76 | 8.29 | 8.41 | 8.25 | 8.15 | 6.10 | 6.01 | 5.96 | 6.01 | 73.58 | 71.46 | 72.24 | 73.74 | 1.34 |
| | B | 8.23 | 5.97 | 72.50 | 8.24 | 8.10 | 8.24 | 8.35 | 6.10 | 6.00 | 5.88 | 5.89 | 74.03 | 74.07 | 71.36 | 70.54 | 2.67 |

TABLE 4

2.5" disk held for 13.5 sec (before and after treating the ⅕th disk, Hold 2 *above the cassette)
PFPE Ave. value

| UV Pos | | UV | Rinse | B.R. | After UV irradiation | | | | After rinsing | | | | Bonded ratio | | | | 0/180 degree difference |
| --- | --- | --- | --- | --- | --- | --- | --- | --- | --- | --- | --- | --- | --- | --- | --- | --- | --- |
| | | | | | 0° | 90° | 180° | 270° | 0° | 90° | 180° | 270° | 0° | 90° | 180° | 270° | |
| 1 | A | | | | | | | | | | | | | | | | |
| | B | | | | | | | | | | | | | | | | |
| 2 | A | | | | | | | | | | | | | | | | |
| | B | | | | | | | | | | | | | | | | |
| 3 | A | | | | | | | | | | | | | | | | |
| | B | | | | | | | | | | | | | | | | |
| 4 | A | | | | | | | | | | | | | | | | |
| | B | | | | | | | | | | | | | | | | |
| 5 | A | | | | | | | | | | | | | | | | |
| | B | | | | | | | | | | | | | | | | |
| 6 | A | | | | | | | | | | | | | | | | |
| | B | | | | | | | | | | | | | | | | |
| 7 | A | | | | | | | | | | | | | | | | |
| | B | | | | | | | | | | | | | | | | |
| 8 | A | | | | | | | | | | | | | | | | |
| | B | | | | | | | | | | | | | | | | |
| 9 | A | | | | | | | | | | | | | | | | |
| | B | | | | | | | | | | | | | | | | |
| 10 | A | | | | | | | | | | | | | | | | |
| | B | | | | | | | | | | | | | | | | |

TABLE 4-continued 2.5" disk held for 13.5 sec (before and after treating the 1/25th disk, Hold 2 *above the cassette)
PFPE Ave. value

| UV Pos | | UV | Rinse | B.R. | After UV irradiation | | | | After rinsing | | | | Bonded ratio | | | | 0/180 degree difference |
|---|---|---|---|---|---|---|---|---|---|---|---|---|---|---|---|---|---|
| | | | | | 0° | 90° | 180° | 270° | 0° | 90° | 180° | 270° | 0° | 90° | 180° | 270° | |
| 11 | A | | | | | | | | | | | | | | | | |
| | B | | | | | | | | | | | | | | | | |
| 12 | A | 8.33 | 6.16 | 73.98 | 8.22 | 8.37 | 8.43 | 8.29 | 6.21 | 6.08 | 6.18 | 6.17 | 75.55 | 72.64 | 73.31 | 74.43 | 2.24 |
| | B | 8.29 | 6.19 | 74.75 | 8.15 | 8.23 | 8.38 | 8.38 | 6.18 | 6.19 | 6.14 | 6.26 | 75.83 | 75.21 | 73.27 | 74.70 | 2.56 |
| 13 | A | | | | | | | | | | | | | | | | |
| | B | | | | | | | | | | | | | | | | |
| 14 | A | | | | | | | | | | | | | | | | |
| | B | | | | | | | | | | | | | | | | |
| 15 | A | | | | | | | | | | | | | | | | |
| | B | | | | | | | | | | | | | | | | |
| 16 | A | | | | | | | | | | | | | | | | |
| | B | | | | | | | | | | | | | | | | |
| 17 | A | | | | | | | | | | | | | | | | |
| | B | | | | | | | | | | | | | | | | |
| 18 | A | | | | | | | | | | | | | | | | |
| | B | | | | | | | | | | | | | | | | |
| 19 | A | | | | | | | | | | | | | | | | |
| | B | | | | | | | | | | | | | | | | |
| 20 | A | | | | | | | | | | | | | | | | |
| | B | | | | | | | | | | | | | | | | |
| 21 | A | | | | | | | | | | | | | | | | |
| | B | | | | | | | | | | | | | | | | |
| 22 | A | | | | | | | | | | | | | | | | |
| | B | | | | | | | | | | | | | | | | |
| 23 | A | 8.30 | 6.18 | 74.47 | 8.09 | 8.42 | 8.37 | 8.32 | 6.17 | 6.25 | 6.11 | 6.19 | 76.27 | 74.23 | 73.00 | 74.40 | 3.27 |
| | B | 8.29 | 6.23 | 75.11 | 8.14 | 8.21 | 8.39 | 8.42 | 6.28 | 6.23 | 6.10 | 6.29 | 77.15 | 75.88 | 72.71 | 74.70 | 4.44 |
| 24 | A | | | | | | | | | | | | | | | | |
| | B | | | | | | | | | | | | | | | | |
| 25 | A | 8.25 | 6.16 | 74.69 | 8.06 | 8.30 | 8.34 | 8.28 | 6.11 | 6.19 | 6.13 | 6.20 | 75.81 | 74.58 | 73.50 | 74.88 | 2.31 |
| | B | 8.27 | 6.08 | 73.49 | 8.10 | 8.23 | 8.35 | 8.39 | 6.05 | 6.07 | 6.04 | 6.14 | 74.69 | 73.75 | 72.34 | 73.18 | 2.36 |

TABLE 5

2.5" disk was not held
PFPE Ave. value

| UV Pos | | UV | Rinse | B.R. | After UV irradiation | | | | After rinsing | | | | Bonded ratio | | | | 0/180 degree difference |
|---|---|---|---|---|---|---|---|---|---|---|---|---|---|---|---|---|---|
| | | | | | 0° | 90° | 180° | 270° | 0° | 90° | 180° | 270° | 0° | 90° | 180° | 270° | |
| 1 | A | 8.33 | 6.03 | 72.35 | 8.24 | 8.29 | 8.47 | 8.33 | 6.06 | 6.05 | 5.94 | 6.06 | 73.54 | 72.98 | 70.13 | 72.75 | 3.41 |
| | B | 8.34 | 6.09 | 72.98 | 8.27 | 8.38 | 8.30 | 8.40 | 6.14 | 6.15 | 5.92 | 6.13 | 74.24 | 73.39 | 71.33 | 72.98 | 2.92 |
| 2 | A | | | | | | | | | | | | | | | | |
| | B | | | | | | | | | | | | | | | | |
| 3 | A | 8.36 | 6.21 | 74.28 | 8.22 | 8.33 | 8.50 | 8.38 | 6.23 | 6.05 | 6.25 | 6.30 | 75.79 | 72.63 | 73.53 | 75.18 | 2.26 |
| | B | 8.33 | 6.20 | 74.42 | 8.31 | 8.30 | 8.32 | 8.37 | 6.16 | 6.31 | 6.19 | 6.12 | 74.13 | 76.02 | 74.40 | 73.12 | −0.27 |
| 4 | A | | | | | | | | | | | | | | | | |
| | B | | | | | | | | | | | | | | | | |
| 5 | A | | | | | | | | | | | | | | | | |
| | B | | | | | | | | | | | | | | | | |
| 6 | A | | | | | | | | | | | | | | | | |
| | B | | | | | | | | | | | | | | | | |
| 7 | A | | | | | | | | | | | | | | | | |
| | B | | | | | | | | | | | | | | | | |
| 8 | A | | | | | | | | | | | | | | | | |
| | B | | | | | | | | | | | | | | | | |
| 9 | A | | | | | | | | | | | | | | | | |
| | B | | | | | | | | | | | | | | | | |
| 10 | A | | | | | | | | | | | | | | | | |
| | B | | | | | | | | | | | | | | | | |
| 11 | A | | | | | | | | | | | | | | | | |
| | B | | | | | | | | | | | | | | | | |
| 12 | A | 8.36 | 6.23 | 74.47 | 8.26 | 8.41 | 8.47 | 8.30 | 6.23 | 6.22 | 6.22 | 6.23 | 75.42 | 73.96 | 73.44 | 75.06 | 1.99 |
| | B | 8.34 | 6.26 | 75.04 | 8.22 | 8.28 | 8.47 | 8.39 | 6.24 | 6.28 | 6.28 | 6.23 | 75.91 | 75.85 | 74.14 | 74.26 | 1.77 |
| 13 | A | | | | | | | | | | | | | | | | |
| | B | | | | | | | | | | | | | | | | |
| 14 | A | | | | | | | | | | | | | | | | |
| | B | | | | | | | | | | | | | | | | |
| 15 | A | | | | | | | | | | | | | | | | |
| | B | | | | | | | | | | | | | | | | |

TABLE 5-continued 2.5" disk was not held
PFPE Ave. value

| | | | | After UV irradiation | | | | After rinsing | | | | Bonded ratio | | | | 0/180 degree |
|---|---|---|---|---|---|---|---|---|---|---|---|---|---|---|---|---|
| UV Pos | UV | Rinse | B.R. | 0° | 90° | 180° | 270° | 0° | 90° | 180° | 270° | 0° | 90° | 180° | 270° | difference |
| 16 A | | | | | | | | | | | | | | | | |
| B | | | | | | | | | | | | | | | | |
| 17 A | | | | | | | | | | | | | | | | |
| B | | | | | | | | | | | | | | | | |
| 18 A | | | | | | | | | | | | | | | | |
| B | | | | | | | | | | | | | | | | |
| 19 A | | | | | | | | | | | | | | | | |
| B | | | | | | | | | | | | | | | | |
| 20 A | | | | | | | | | | | | | | | | |
| B | | | | | | | | | | | | | | | | |
| 21 A | | | | | | | | | | | | | | | | |
| B | | | | | | | | | | | | | | | | |
| 22 A | | | | | | | | | | | | | | | | |
| B | | | | | | | | | | | | | | | | |
| 23 A | 8.33 | 6.09 | 73.11 | 8.39 | 8.23 | 8.33 | 8.37 | 6.22 | 6.03 | 5.98 | 6.13 | 74.14 | 73.27 | 71.79 | 73.24 | 2.35 |
| B | 8.10 | 5.91 | 72.96 | 8.18 | 8.04 | 8.10 | 8.08 | 6.08 | 5.98 | 5.76 | 5.82 | 74.33 | 74.38 | 71.11 | 72.03 | 3.22 |
| 24 A | | | | | | | | | | | | | | | | |
| B | | | | | | | | | | | | | | | | |
| 25 A | 8.35 | 5.92 | 70.88 | 8.25 | 8.31 | 8.34 | 8.51 | 5.98 | 5.92 | 5.76 | 6.02 | 72.48 | 71.24 | 69.06 | 70.74 | 3.42 |
| B | 8.26 | 5.77 | 69.86 | 8.03 | 8.48 | 8.20 | 8.33 | 5.72 | 5.91 | 5.66 | 5.79 | 71.23 | 69.69 | 69.02 | 69.51 | 2.21 |

The 25th magnetic disk is irradiated with the direct ultraviolet rays and returned to the cassette. Immediate thereafter (before being ejected from the cassette), this magnetic disk is left for a predetermined time period, and the indirect ultraviolet rays are radiated to the few magnetic disks having lower bonded ratios (the 23rd to 25th magnetic disks). In this manner, the bonded ratio is increased. When there is a held magnetic disk in the case of FIG. 2, the magnetic disk was held for the same period of time as the time period for which the direct ultraviolet rays were radiated (9 seconds). In the case of Hold 1 shown in FIG. 3, the holding time was equal to the time period for which the direct ultraviolet rays were radiated (9 seconds). In the case of Hold 2 shown in FIG. 3, the retaining time was 1.5 times the time period for which the direct ultraviolet rays were radiated (13.5 seconds).

According to the data shown in FIG. 2, holding the last few magnetic disks can reduce the variation in the bonded ratio by approximately 0.3%, compared to when no magnetic disks are held. According to FIG. 3, the variation in the bonded ratio was reduced by 5.2% when no magnetic disks were held, 3.3% in Hold 1, and 1.6% in Hold 2.

According to these results, holding the last few magnetic disks having lower bonded ratios regardless of their size allows the radiation of the indirect ultraviolet rays and the formation of the bonded lubricant layers, improving the variation in film thickness.

Unlike the conventional process that produce some magnetic recording media having thinner bonded lubricant layers, the present invention is capable of controlling the indirect ultraviolet rays, reducing the variation in film thickness of the bonded lubricant layers in the cassette, and producing magnetic recording media respectively having lubricant layers of even thickness.

What has been described above includes examples of embodiments represented by the appended claims. It is, of course, not possible to describe every conceivable combination of components or methodologies encompassed by the claims, but it should be understood that many further combinations and permutations are possible. Accordingly, the claims are intended to embrace all such combinations, permutations, alterations, modifications and variations that fall within the spirit and scope of the claims. Moreover, the above description, and the Abstract, are not intended to be exhaustive or to limit the spirit and scope of the claims to the precise forms disclosed.

What is claimed is:

1. A method for treating a plurality of magnetic recording media with ultraviolet radiation, each of the plurality of magnetic recording media having a magnetic film, a protective film, and a lubricant film on a non-magnetic substrate, the method comprising:

providing a cassette that holds only the plurality of magnetic recording media so that no other magnetic recording media is disposed within the cassette;

moving the plurality of magnetic recording media to a UV lamp house;

a first irradiating step of irradiating each of the plurality of magnetic recording media with ultraviolet radiation from the UV lamp house so that a last magnetic recording media of the plurality of magnetic recording media is irradiated with the ultraviolet radiation for a first time period and after any other magnetic recording media of the plurality of magnetic recording media;

after the first irradiating step, moving the plurality of magnetic recording media to the cassette; and concurrently with and after the moving the plurality of magnetic recording media to the cassette, a second irradiating step of further irradiating each of a group of the plurality of magnetic recording media with ultraviolet radiation so that the last magnetic recording media is irradiated with ultraviolet radiation from the UV lamp house for a predetermined holding time period that is 1 to 1.5 times the first time period, the group of magnetic recording media including less than all of the plurality of magnetic recording media.

2. The method according to claim 1, wherein the first irradiating step includes irradiating each of the plurality of magnetic recording media with ultraviolet radiation for the first time period, and the second irradiating step includes irradiating each of the group of magnetic recording media with ultraviolet radiation for the predetermined holding time period.

3. The method according to claim 2, wherein the group of magnetic recording media is irradiated in the second irradiating step while being held by a lifter.

4. The method according to claim 1, wherein in the first irradiating step, each of the plurality of magnetic recording media is moved to an interior of the UV lamp house, to be irradiated therein.

5. The method according to claim 4, wherein the moving the plurality of magnetic recording media to the cassette includes each of the plurality of magnetic media being removed from the UV lamp house and then moved to the cassette.

6. The method according to claim 5, wherein in the second irradiating step, the plurality of magnetic recording media is disposed in the cassette.

7. The method according to claim 6, wherein in the second irradiating step, each of the group of the magnetic recording media is irradiated with ultraviolet radiation leaking from the UV lamp house.

8. The method according to claim 7, wherein the first irradiating step includes irradiating each of the plurality of magnetic recording media with ultraviolet radiation for the first time period, and the second irradiating step includes irradiating each of the group of magnetic recording media with ultraviolet radiation for the predetermined holding time period.

9. The method according to claim 4, wherein in the second irradiating step, each of the group of magnetic recording media is removed from the UV lamp house and then irradiated while being held by a lifter.

10. The method according to claim 9, wherein the second irradiating step includes irradiating the group of magnetic recording media with ultraviolet radiation leaking from the UV lamp house.

11. The method according to claim 10, wherein the first irradiating step includes irradiating each of the plurality of magnetic recording media with ultraviolet radiation for the first time period, and the second irradiating step includes irradiating each of the group of magnetic recording media with ultraviolet radiation for the predetermined holding time period.

12. The method according to claim 11, wherein in the second irradiating step, after each of the group of magnetic recording media is irradiated the respective magnetic recording medium is moved by the lifter to the cassette.

* * * * *